(12) United States Patent
Wilson

(10) Patent No.: US 10,407,165 B2
(45) Date of Patent: Sep. 10, 2019

(54) AIRCRAFT LANDING GEAR

(71) Applicant: Airbus Operations Limited, Bristol (GB)

(72) Inventor: Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 335 days.

(21) Appl. No.: 15/386,116

(22) Filed: Dec. 21, 2016

(65) Prior Publication Data
US 2017/0174329 A1 Jun. 22, 2017

(30) Foreign Application Priority Data

Dec. 22, 2015 (GB) .................................. 1522695.4

(51) Int. Cl.
| | |
|---|---|
| B64C 25/40 | (2006.01) |
| B64C 25/42 | (2006.01) |
| B64C 25/34 | (2006.01) |

(52) U.S. Cl.
CPC ............ *B64C 25/405* (2013.01); *B64C 25/34* (2013.01); *B64C 25/42* (2013.01); *Y02T 50/823* (2013.01)

(58) Field of Classification Search
CPC ....... B64C 25/42; B64C 25/34; B64C 25/405; F16D 61/00; F16D 63/002; B60T 2270/60
See application file for complete search history.

(56) References Cited

U.S. PATENT DOCUMENTS

| | | | | |
|---|---|---|---|---|
| 3,850,389 | A | * 11/1974 | Dixon | ..................... B64C 25/40 244/103 S |
| 3,874,619 | A | * 4/1975 | Collins | ................. B64C 25/405 180/7.1 |
| 3,918,558 | A | * 11/1975 | Bryant | .................... B60T 1/087 180/54.1 |

(Continued)

FOREIGN PATENT DOCUMENTS

| | | |
|---|---|---|
| DE | 3545657 A1 | 6/1987 |
| DE | 3831596 A1 | 3/1990 |

(Continued)

OTHER PUBLICATIONS

EP Communication in EP Appln No. 16204667, dated May 9, 2017.
(Continued)

*Primary Examiner* — Magdalena Topolski
(74) *Attorney, Agent, or Firm* — Nixon & Vanderhye P.C.

(57) ABSTRACT

An aircraft landing gear comprising a wheel rotatably mounted on an axle, a first gearing element that rotates with the wheel, a second gearing element configured to mesh with the first gearing element such that rotation of the first gearing element causes rotation of the second gearing element, wherein the second gearing element is connected to a generator, such that rotation of the second gearing element causes the generator to generate electrical energy, further comprising a heat dissipation device connected to the generator wherein the heat dissipation device comprises an electrical heating element connectable to the generator to receive generated electrical energy and convert it to heat energy, and a fluid receptacle adjacent the heating element, such that fluid in the receptacle can be heated. An aircraft landing gear further comprising a cavitation braking device, an aircraft and a method of braking.

14 Claims, 3 Drawing Sheets

(56) References Cited

U.S. PATENT DOCUMENTS

| | | | |
|---|---|---|---|
| 4,018,052 A * | 4/1977 | Laussermair | B60K 6/105 |
| | | | 475/267 |
| 2003/0158638 A1 | 8/2003 | Yakes et al. | |
| 2005/0224642 A1 | 10/2005 | Sullivan | |
| 2007/0144800 A1 | 6/2007 | Stone | |
| 2008/0258014 A1 | 10/2008 | McCoskey et al. | |
| 2009/0053475 A1 | 2/2009 | Higashijima et al. | |
| 2011/0198439 A1 | 8/2011 | Rotger et al. | |
| 2011/0253833 A1 | 10/2011 | Anastasio et al. | |
| 2013/0082045 A1 | 4/2013 | Mazumdar | |
| 2013/0087654 A1 | 4/2013 | Seibt | |
| 2015/0127195 A1 | 5/2015 | Cahill | |
| 2015/0159968 A1 | 6/2015 | Edelson et al. | |
| 2016/0200428 A1 | 7/2016 | Morris et al. | |
| 2017/0029096 A1 | 2/2017 | Didey et al. | |
| 2017/0113788 A1* | 4/2017 | Essinger | B64C 25/405 |
| 2019/0003534 A1* | 1/2019 | Estepa Rodriguez | B60K 7/00 |

FOREIGN PATENT DOCUMENTS

| | | |
|---|---|---|
| DE | 102010017990 A1 | 10/2011 |
| EP | 2028383 A2 | 2/2009 |
| EP | 2377758 A1 | 10/2011 |
| EP | 2565119 A1 | 3/2013 |
| EP | 2871104 A1 | 5/2015 |
| GB | 942583 A | 11/1963 |
| RU | 2587322 C1 | 6/2016 |
| WO | 2005102839 A2 | 11/2005 |
| WO | 2010003911 A1 | 1/2010 |
| WO | 2015025131 A1 | 2/2015 |
| WO | 2015155538 A1 | 10/2015 |

OTHER PUBLICATIONS

UKIPO Search Report dated Nov. 11, 2016 Great Britain Application No. 1522695.4.
EESR for EP 16 20 4667 dated Sep. 29, 2017—16pp.

* cited by examiner

AIRCRAFT LANDING GEAR

RELATED APPLICATIONS

The present application claims priority to Great Britain Patent Application Number 1522695.4, filed Dec. 22, 2015, the disclosure of which is hereby incorporated by reference herein in its entirety.

BACKGROUND OF THE INVENTION

The present disclosure relates to aircraft landing gear.

The present invention concerns aircraft landing gear. More particularly, but not exclusively, this invention concerns an aircraft landing gear comprising an axle and a wheel rotatably mounted on the axle.

The invention also concerns an aircraft and a method of braking.

Many commercial passenger aircraft use carbon brakes, comprising a number of "carbon-carbon" composite disks that can be pushed together by hydraulic actuators, in order slow relative rotation of the disks. The carbon disks are subject to wear, both during high-speed braking and especially during low-speed braking due to "surface plucking" of the brake disk surfaces.

Various e-taxi systems have been proposed, where a motor is used to drive rotation of the landing gear wheels whilst the aircraft is on the ground. One such system is proposed in WO 2015/025131 and describes the motor being connected to a toothed drive pinion that can mesh with a toothed ring gear on the wheel hub. An actuator is proposed to be used to move the toothed drive pinion and ring gear into and out of engagement with each other. When engaged, the motor can drive rotation of the wheel. There is also a proposal for the e-taxi system to include the ability to provide a reverse braking function (i.e. by using the motor as a generator to convert kinetic energy into electrical energy and slow forward movement of the wheel).

However, such an arrangement would require a large (and heavy) resistor to be connected to the generator so that the electrical energy generated from the kinetic energy can be converted into heat energy and dissipated. Alternatively, large batteries or super conductors may be used.

The present invention seeks to mitigate the above-mentioned problems. Alternatively or additionally, the present invention seeks to provide an improved aircraft landing gear.

SUMMARY OF THE INVENTION

The present invention provides, according to a first aspect, an aircraft landing gear comprising an axle and a wheel rotatably mounted on the axle, a first gearing element connected to the wheel, such that it rotates with the wheel, a second gearing element, wherein the second gearing element is configured to mesh with the first gearing element such that rotation of the first gearing element causes rotation of the second gearing element, wherein the second gearing element is connected to a generator, such that rotation of the second gearing element causes the generator to generate electrical energy, the aircraft landing gear further comprising a heat dissipation device connected to the generator such that electrical energy generated by the generator is dissipated in the form of heat energy by the heat dissipation device, wherein the heat dissipation device comprises an electrical heating element connectable to the generator to receive generated electrical energy and convert it to heat energy, and a fluid receptacle adjacent the heating element, such that fluid in the receptacle can be heated by the heating element.

In use, the second gearing element is rotated by the first gearing element. This rotation (kinetic energy) is converted into electrical energy by the generator. This electrical energy is converted into heat energy by the electrical heating element. This heat energy is then dissipated by the fluid in the fluid receptacle. Hence, the arrangement acts to slow rotation of the first gearing element (and therefore slow rotation of the wheel and the ground speed of the aircraft itself).

Such an arrangement allows the heat energy to be dissipated quickly by the fluid in the fluid receptacle.

The second gearing element may be directly or indirectly connected to the generator.

The walls of the fluid receptacle may be relatively thin and/or conductive so that the heat energy is efficiently transferred from the electrical heating element to the fluid.

The fluid receptacle may be provided with fluid. The fluid is preferably a liquid and may turn into a gas upon heating. That gas may then leave the fluid receptacle.

The fluid receptacle may be connected to a fluid supply line.

The fluid supply line may comprise a pump for urging fluid from a fluid reservoir to the fluid receptacle.

The generator may be configured to act as a motor to rotate the second gearing element and thus drive rotation of the first gearing element and wheel, wherein the motor is controlled by motor control electronics.

For example, when the generator acts as a motor to drive rotation of the first and second gearing elements and the wheel, the generator rotates either in a first direction to drive the wheel in a forwards direction or in a second, opposite direction to drive the wheel in a backwards direction, and wherein, when the generator acts as a generator to slow rotation of the wheel and first and second gearing elements, the generator is rotated in either the first direction when the wheel rotates in the forwards direction or in the second direction when the wheel rotates in the backwards direction.

The first and second gearing elements may be moveable between a meshing configuration and a non-meshing configuration, the movement being effected by an actuator controlled by actuator control electronics.

The fluid supply line may include a flow passage through or adjacent the motor control electronics or actuator control electronics, such that the fluid in the fluid passage is heated by the control electronics.

The fluid may comprise water. Hence, the water may turn to gas (i.e. steam) during heating. The steam may evaporate or otherwise leave the fluid receptacle.

The heat dissipation device may be a steam generator.

The steam generator may be a mono tube steam generator.

The first and second gearing elements may comprise a roller gear and corresponding sprocket.

According to a second aspect of the invention there is also provided an aircraft comprising the aircraft landing gear as described above in relation to the first aspect of the invention.

According to a third aspect of the invention there is also provided a method of braking an aircraft wherein the aircraft is the aircraft as described above in relation to the second aspect of the invention.

According to a fourth aspect of the invention there is also provided a method of braking an aircraft, the aircraft comprising the aircraft landing gear as described above in relation to the first aspect of the invention, the method comprising the steps of rotating the wheel about the axle, meshing the first and second gearing elements, thereby causing the second gearing element to be rotated by the first gearing element and causing the generator to generate electrical energy, and connecting the generator to the heating element of the heat dissipation device and providing fluid to the fluid receptacle, thereby causing the generated electrical energy to heat the fluid.

According to a fifth aspect of the invention there is also provided an aircraft landing gear comprising an axle and a wheel rotatably mounted on the axle, a cavitation braking device for slowing rotation of the wheel about the axle, wherein the braking device comprises a first part connected to the axle, the first part having a first cavitation surface, a second part connected to the wheel, the second part having a second cavitation surface, and a liquid channel between the first and second cavitation surfaces, wherein both of the first and second cavitation surfaces are provided with a number of indent portions such that, when the wheel is rotating on the axle and the second part is rotating with respect to the second part and when liquid is supplied to the liquid channel, the liquid is caused to cavitate when at least one indent portion on the first cavitation surface lines up with an indent portion on the second cavitation surface.

Cavitation is the sudden formation and collapse of low-pressure bubbles. In the above arrangement, the lining up of the indents causes the liquid in the channel adjacent to the indents to suddenly expand to fill the suddenly increased volume available. This lower pressure causes gas bubbles to form. The bubbles then collapse as the indentations move away from each other. This rapid expansion and contraction generates heat in the liquid that can then be dissipated.

In use, the second part is rotated by the wheel. This rotation (kinetic energy) is converted into heat energy by the cavitation braking device. This heat energy is then dissipated by the liquid. Hence, the arrangement acts to slow rotation of the wheel and the reduce the ground speed of the aircraft itself.

At least one of the indent portions may be in the form of a blind hole in the cavitation surface. This provides a sudden increase in volume available to the liquid when the indent lines up with another similar indent.

The braking device may further comprise a liquid supply line for supplying liquid to the liquid channel.

The liquid supply line may comprise a pump for urging liquid into the liquid channel.

The aircraft landing gear may further comprise a first gearing element connected to the wheel, such that it rotates with the wheel, a second gearing element, wherein the second gearing element is configured to mesh with the first gearing element such that rotation of the second gearing element causes rotation of the first gearing element, wherein the second gearing element is connected a motor, such that rotation of the second gearing element by the motor drives rotation of the first gearing element and the wheel.

The motor may be configured to act as a generator to generate electrical energy upon rotation of the second gearing element by the first gearing element.

The first and second cavitation surfaces may be substantially parallel to each other and at an angle to the wheel axle, such that the liquid channel forms a cone shape.

Bearings may be provided between the first part or axle and the second part. This allows the first part and second part to be freely rotating when there is no liquid present in the channel.

The second part may be mounted externally to the first part with respect to the axle. This allows the second part to be mounted effectively on the wheel.

The first cavitation surface may be externally facing with respect to the axle and the second cavitation surface may be internally facing with respect to the axle.

The aircraft landing gear may further comprise an additional braking device for slowing rotation of the wheel about the axle at lower rotational speeds than the cavitation braking device.

According to a sixth aspect of the invention there is also provided an aircraft comprising the aircraft landing gear as described above in relation to the fifth aspect of the invention.

According to a sixth aspect of the invention there is also provided a method of braking an aircraft wherein the aircraft is the aircraft described above in relation to the sixth aspect of the invention.

According to a seventh aspect of the invention there is also provided a method of braking an aircraft, comprising the steps of providing the aircraft landing gear as described above in relation to the fifth aspect of the invention, rotating the wheel about the axle such that the second part rotates with respect to the first part, thereby causing the indent portions in the first and second cavitation surfaces to momentarily line up with each other, and supplying liquid to the liquid channel, such that the liquid cavitates when the indent portions momentarily line up.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
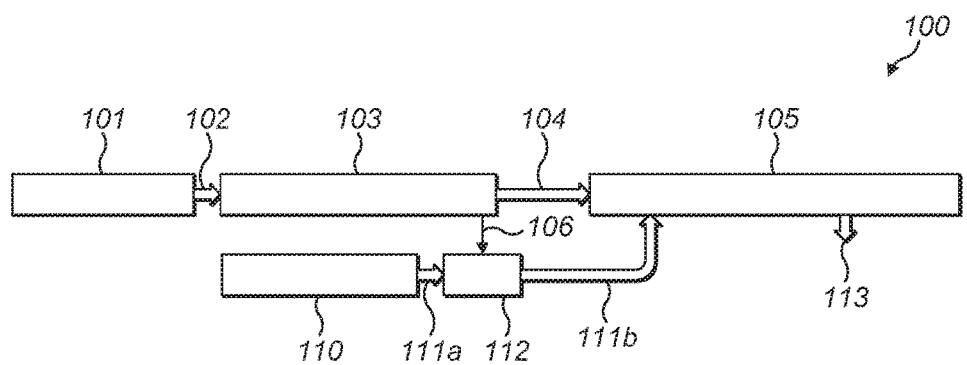
FIG. 1 shows a diagrammatic view of an e-taxi system architecture, according to a first embodiment of the invention.

FIG. 1 shows a diagrammatic view of an e-taxi system architecture 100, as part of an aircraft landing gear, according to a first embodiment of the invention. The e-taxi architecture 100 may be part of an otherwise known landing gear arrangement, such as described in WO 2015/025131. The e-taxi system 100 comprises a wheel actuator 101 connected by an electrical connection 102 to the e-taxi power electronics 103, including a motor (not shown) that can also act as a generator. The power electronics 103 are connected by an electrical connection 104 to a mono tube steam generator 105.

Also shown is an aircraft water supply 110 connected by a water supply line 111a to a pump 112 and from the pump 112 by water supply line 111b to the mono tube steam generator 105. Also shown is the exhaustion of steam from the mono tube steam generator at arrow 113. Also shown is an electrical connection 106 between the e-taxi power electronics 103 and the pump 112 so that the power electronics 103 can provide power to the pump 112 to pump water from the aircraft water supply 110 to the mono tube steam generator 105.

In use, the e-taxi power electronics 103 are used to control the wheel actuator 101 in the normal way. In other words, the power electronics 103 can control the actuator 101 to move a second gearing element, not shown (connected to the motor/generator) to mesh with a first gearing element, not shown (connected to the landing gear wheel) to either drive or brake the wheel in the forwards or backwards direction.

When braking the wheel, the motor acts as a generator and rotation of the wheel (and first gearing element) causes rotation of the second gearing element. This enables the generator to generate electrical energy from the kinetic energy of the second gearing element. This electrical energy is provided through electrical connection 104 to the mono tube steam generator 105. The mono tube steam generator 105 includes a heating element (not shown) so that the electrical energy is converted to heat energy.

In use, the pump 112 is powered to supply water (from the aircraft water supply 110) to the mono tube steam generator 105. The water is contained within a fluid receptacle (not shown) in the mono tube steam generator 105 so that the water is heated by the heating element of the mono tube generator 105. The water then turns to steam and can be exhausted at 113.

Hence, kinetic energy is taken out of the wheel and converted into heat energy in the water, which is then exhausted as steam. Hence, the rotation of the wheel and movement of the aircraft is slowed.

Figure 2:
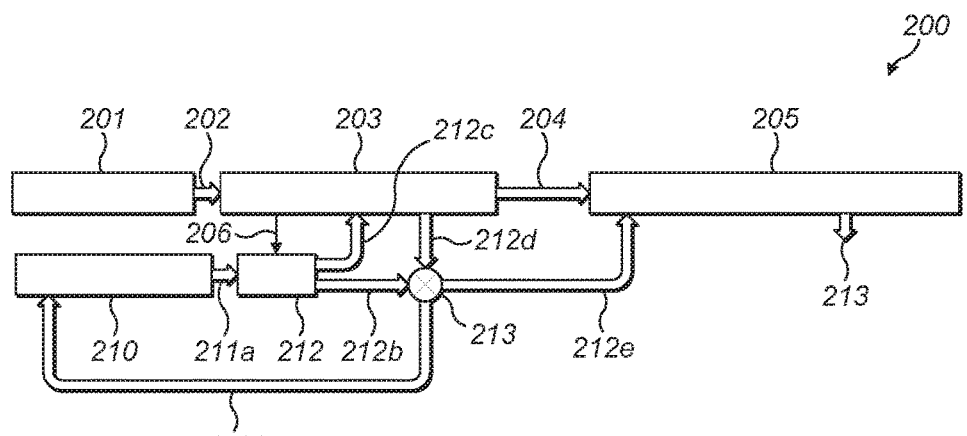
FIG. 2 shows a diagrammatic view of an e-taxi system architecture, according to a second embodiment of the invention.

FIG. 2 shows a diagrammatic view of an e-taxi system architecture 200, according to a second embodiment of the invention. This second embodiment is similar to the first embodiment and the same numbering will be used (preceded by a "2" instead of a "1") for like elements.

The e-taxi architecture 200 may be part of an otherwise known landing gear arrangement, such as described in WO 2015/025131. The e-taxi system 200 comprises a wheel actuator 201 connected by an electrical connection 202 to the e-taxi power electronics 203, including a motor (not shown) that can also act as a generator. The power electronics 203 are connected by an electrical connection 204 to a mono tube steam generator 205.

Also shown is an aircraft water supply 210 connected by a water supply line 211a to a pump 212 and from the pump 212 by water supply line 211b to a valve 213 and from the valve 213 to the mono tube steam generator 205 thorough water supply line 212e. Also shown is the exhaustion of steam from the mono tube steam generator at arrow 213. Also shown is an electrical connection 206 between the e-taxi power electronics 203 and the pump 212 so that the power electronics 203 can provide power to the pump 212 to pump water from the aircraft water supply 210 to the mono tube steam generator 205.

In addition, there is a water supply line 212c from the pump 212 to the e-taxi control electronics 203 and a return water line 212d from the e-taxi control electronics 2013 to the valve 213. This allows water to be supplied adjacent the control electronics 203 so that they can cool the electronics 203. The return water can then be provided to the mono tube steam generator 205 through valve 213 and water supply line 212e.

There is another flow line connected to the valve 213 in the form of a water return line 212f from the valve 213 back to the aircraft water supply 210. Hence, valve 213 can be controlled to return water to the aircraft water supply 210.

The valve 213 can have various positions to allow/prevent the following flow paths: i) from the pump 212 to the water supply line 212e through supply line 212b, ii) from the control electronics 203 to the water supply line 212e, iii) from the pump 212 to the water return line 212f through supply line 212b and iv) from the control electronics 203 to the water return line 212f.

In use, the e-taxi power electronics 203 are used to control the wheel actuator 201 in the normal way. In other words, the power electronics 203 can control the actuator 201 to move a second gearing element, not shown (connected to the motor/generator) to mesh with a first gearing element, not shown (connected to the landing gear wheel) to either drive or brake the wheel in the forwards or backwards direction.

When braking the wheel, the motor acts as a generator and rotation of the wheel (and first gearing element) causes rotation of the second gearing element. This enables the generator to generate electrical energy from the kinetic energy of the second gearing element. This electrical energy is provided through electrical connection 204 to the mono tube steam generator 205. The mono tube steam generator 205 includes a heating element (not shown) so that the electrical energy is converted to heat energy.

In use, the pump 212 is powered to supply water (from the aircraft water supply 210) to the mono tube steam generator 205 in two ways. The first way is through supply line 212b, valve 213 and supply line 212e. The second way is through supply line 212c, past the control electronics 203 to cool them and then through supply line 212d, valve 213 and supply line 212e. The water from supply line 212e is contained within a fluid receptacle (not shown) in the mono tube steam generator 205 so that the water is heated by the heating element of the mono tube generator 205. The water then turns to steam and can be exhausted at 213.

Hence, kinetic energy is taken out of the wheel and converted into heat energy in the water, which is then exhausted as steam. Hence, the rotation of the wheel and movement of the aircraft is slowed.

It is also possible, during use, to return water from either of supply lines 212d or 212b back to the aircraft water supply 210 via valve 213 and return line 212f.

Figure 3:
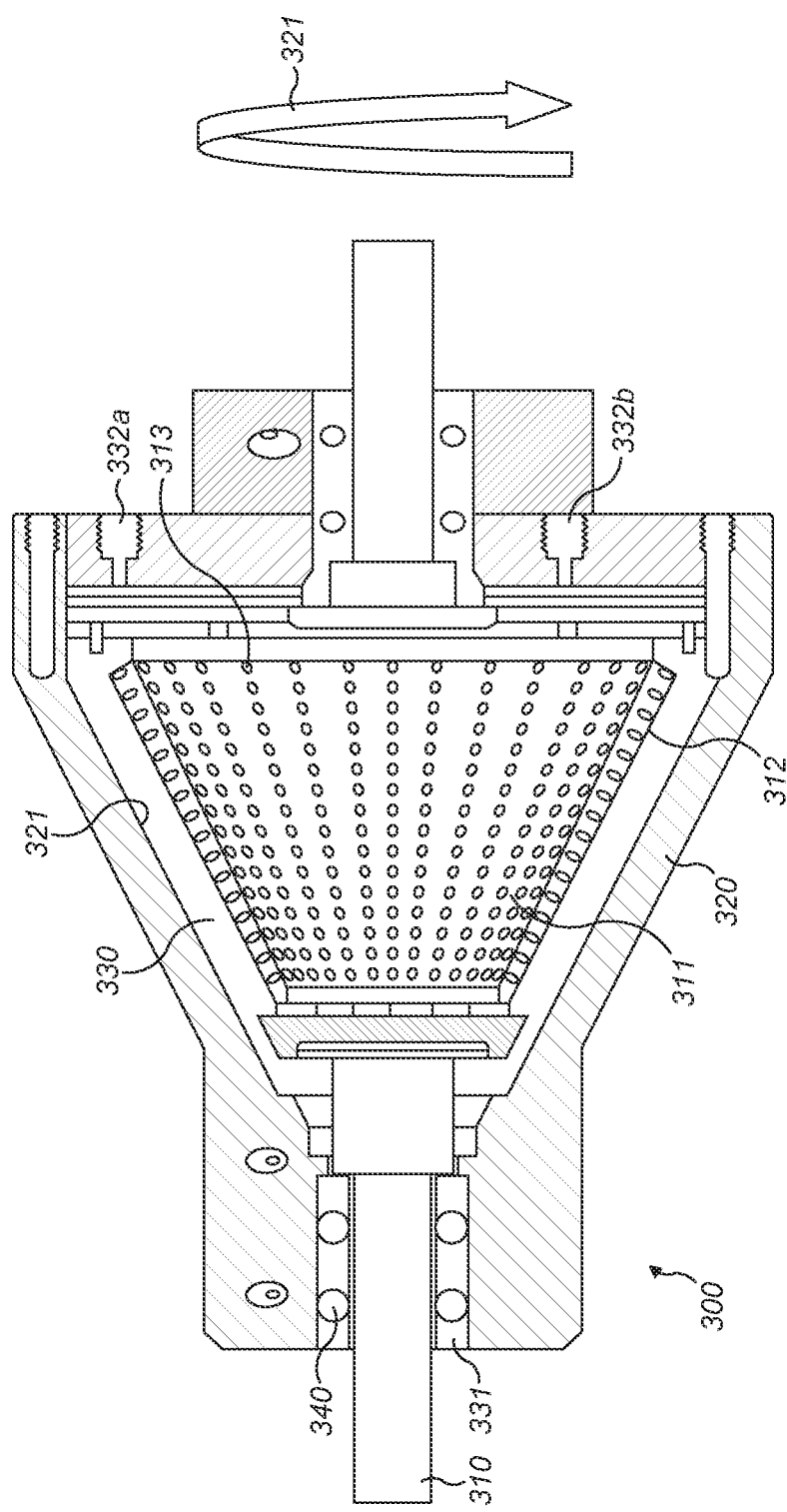
FIG. 3 shows a side view of a cavitation braking device according to a third embodiment of the invention.

FIG. 3 shows a side view of a cavitation braking device 300 according to a third embodiment of the invention. The cavitation braking device 300 may be part of an otherwise known landing gear arrangement, such as described in WO 2015/025131. The cavitation device 300 comprises an inner first part 311 fixedly attached to a wheel axle 310. Hence, the first part does not rotate. The cavitation braking device also comprises an outer second part 320 mounted inside a wheel hub (not shown). The second part therefore rotates (shown by arrow 321) with the wheel so that it rotates around the first part 311.

The first part 311 is in the form of a cone with the slanted surface 312 being at an angle of approximately 30 degrees to the axle. This slanted surface 312 is a first cavitation surface 312 and comprises a number of blind holes 313 extending from the surface.

The second part 320 also has a cavitation surface, the second cavitation surface 322. This surface is parallel to but slightly spaced from the first cavitation surface 312 and also has a number of blind holes extending from the surface.

The second part 320 extends over the first part 311 and over part of the axle 310. Bearings 340 are provided in between the second part and the axle 310 such that the second part 320 can rotate smoothly around the first part 311 and axle 310.

The spacing of the cavitation surfaces 312, 322 provides a fluid channel 330. There is an inlet 331 to the fluid channel at the narrow end (i.e. top of the cone) of the cavitation device (left hand side of FIG. 3) to allow fluid in and two outlets 332a and 332b at the wider end (i.e. bottom of the cone) of the cavitation device (right hand side of FIG. 3) to allow fluid out.

In use, the wheel (not shown) is rotated around the axle 310, causing the second part 320 to rotate around the first part 311.

When it is wished to brake the wheel rotation, water is supplied through a fluid supply line to the fluid inlet 331 and enters the fluid channel 330. As the second part 320 rotates, blind holes in the second part 320 momentarily line up with blind holes 313 in the first part 311. As this occurs, the water located there rapidly expands into the suddenly larger volume available. This causes the water to suddenly form low pressure gaseous water bubbles. Then, when the blind holes no longer line up, the water rapidly contracts, re-forming liquid water. This sudden formation and collapse of the gaseous water is known as cavitation and generates heat in the water.

Thus, when water is in the fluid channel, the kinetic energy of the wheel and first part is converted into heat energy in the water and the rotation of the wheel is slowed.

Figure 4:
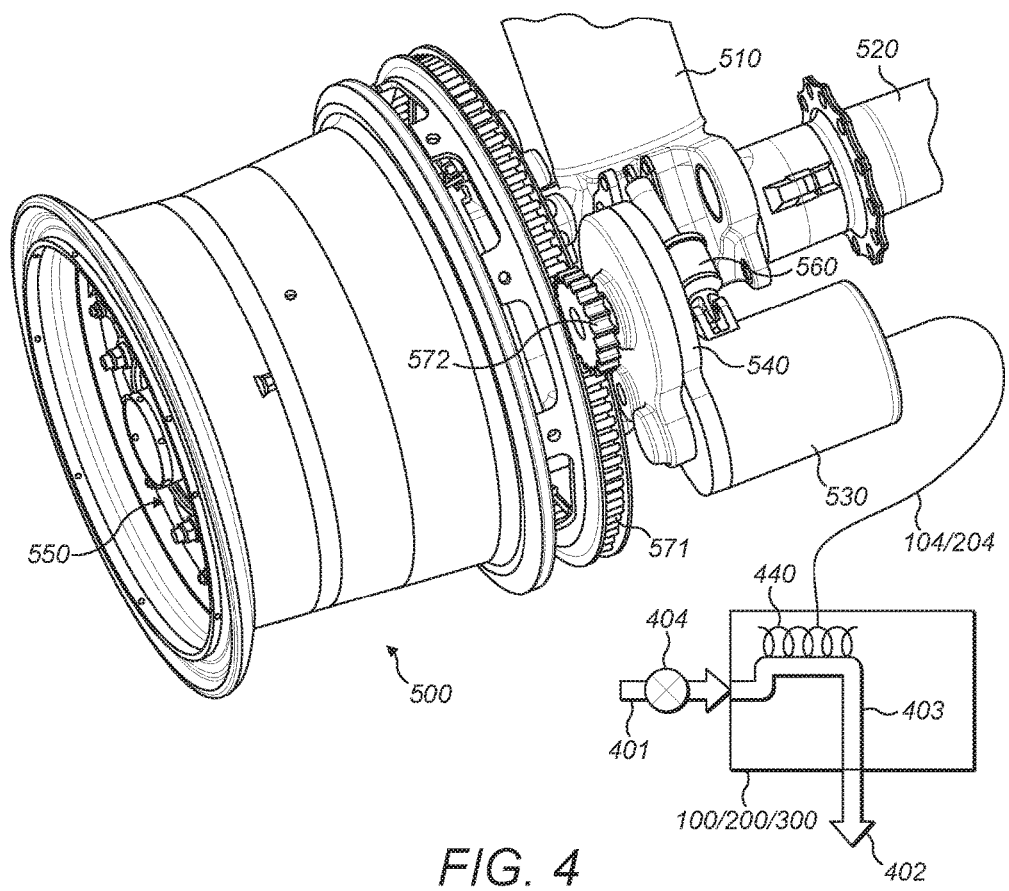
FIG. 4 shows a partly diagrammatic view of an aircraft landing gear according to the present invention.

FIG. 4 shows a partly diagrammatic view of an aircraft landing gear 500 according to the present invention. The landing gear 500 includes at least one wheel 550 rotatably mounted on an axle 520. The axle 520 is mounted at a lower end of a main landing gear leg 510. An e-taxi system is mounted on the landing gear and comprises a motor/generator 530, a clutch 540, a roller gear 571 (first gearing element) connected to the wheel rim and a corresponding sprocket 572 (second gearing element) connected to the motor/generator 530 via the clutch 540. There is also an actuator 560 for moving the sprocket 572 into and out of meshing engagement with the roller gear 571.

The aircraft landing gear 500 includes either the e-taxi architecture of FIG. 1 (100) or FIG. 2 (200) and/or the cavitation braking device 300 of FIG. 3 (shown diagrammatically). These are connected to the motor/generator 530 by electrical connection 104/204 and have a fluid inflow 401 (including pump 404) and fluid outflow 402 with a fluid path/receptacle 403 inside. Also shown is a heating element 440 inside.

Figure 5:
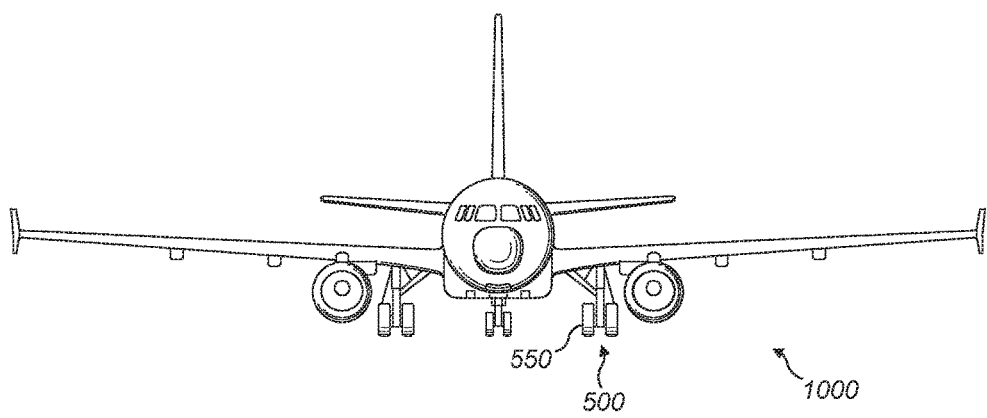
FIG. 5 shows an aircraft including an aircraft landing gear according to the present invention.

FIG. 5 shows an aircraft 1000 including the aircraft landing gear 500 of FIG. 4.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above example use water as the fluid being used. However, any other suitable fluid may be used.

The mono tube steam generator of FIGS. 1 and 2 may be replaced by a different type of steam generator or any other type of suitable heat dissipation device.

Optionally, the steam (or gaseous form of the supplied fluid) may be exhausted or otherwise allowed to escape from the cavitation device or heat dissipation device. Alternatively, the gaseous fluid may be retained. For example, the gaseous fluid may be allowed to cool and be re-used in the heat dissipation device/cavitation device or the gaseous fluid might be re-used elsewhere on the aircraft.

The aircraft landing gear may comprise any other number of other braking devices, in addition to those described here.

The blind holes in the cavitation device may be replaced by any other suitable surface indentation.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear comprising:
an axle and a wheel rotatably mounted on the axle,
a first gearing element connected to the wheel, such that it rotates with the wheel,
a second gearing element, wherein the second gearing element is configured to mesh with the first gearing element such that rotation of the first gearing element causes rotation of the second gearing element,
wherein the second gearing element is connected to a generator, such that rotation of the second gearing element causes the generator to generate electrical energy,
the aircraft landing gear further comprising:
a heat dissipation device connected to the generator such that electrical energy generated by the generator is dissipated in the form of heat energy by the heat dissipation device,
wherein the heat dissipation device comprises:
an electrical heating element connectable to the generator to receive generated electrical energy and convert it to heat energy, and
a fluid receptacle adjacent the heating element, such that fluid in the receptacle can be heated by the heating element.

2. The aircraft landing gear as claimed in claim 1, wherein the fluid receptacle is connected to a fluid supply line.

3. The aircraft landing gear as claimed in claim 2, wherein the fluid supply line comprises a pump for urging fluid from a fluid reservoir to the fluid receptacle.

4. The aircraft landing gear as claimed in claim 1, wherein the generator is configured to act as a motor to rotate the second gearing element and thus drive rotation of the first gearing element and wheel, wherein the motor is controlled by motor control electronics.

5. The aircraft landing gear as claimed in claim 4, wherein the fluid receptacle is connected to a fluid supply line, when the generator acts as a motor to drive rotation of the first and second gearing elements and the wheel, the generator rotates either in a first direction to drive the wheel in a forwards direction or in a second, opposite direction to drive the wheel in a backwards direction, and wherein, when the generator acts as a generator to slow rotation of the wheel and first and second gearing elements, the generator is rotated in either the first direction when the wheel rotates in the forwards direction or in the second direction when the wheel rotates in the backwards direction.

6. The aircraft landing gear as claimed in claim 2, wherein the first and second gearing elements are moveable between a meshing configuration and a non-meshing configuration, the movement being effected by an actuator controlled by actuator control electronics.

7. The aircraft landing gear as claimed in claim 4, wherein the fluid supply line includes a flow passage through or adjacent the motor control electronics or actuator control electronics, such that the fluid in the fluid passage is heated by the control electronics.

8. The aircraft landing gear as claimed in claim 1, wherein the fluid comprises water.

9. The aircraft landing gear as claimed in claim 8, wherein the heat dissipation device is a steam generator.

10. The aircraft landing gear as claimed in claim 9, wherein the steam generator is a mono tube steam generator.

11. The aircraft landing gear as claimed in claim 1, wherein the first and second gearing elements comprise a roller gear and corresponding sprocket.

12. An aircraft comprising the aircraft landing gear as claimed in claim 1.

13. A method of braking an aircraft wherein the aircraft is the aircraft of claim 12.

14. A method of braking an aircraft, the aircraft comprising the aircraft landing gear of claim 1, the method comprising the steps of:
  rotating the wheel about the axle,
  meshing the first and second gearing elements, thereby causing the second gearing element to be rotated by the first gearing element and causing the generator to generate electrical energy, and
  connecting the generator to the heating element of the heat dissipation device and providing fluid to the fluid receptacle, thereby causing the generated electrical energy to heat the fluid.

* * * * *